(12) United States Patent
Kang et al.

(10) Patent No.: US 10,962,834 B2
(45) Date of Patent: Mar. 30, 2021

(54) OPTICAL FILTER HAVING METAL OXIDE PARTICLES AND NON-METAL INORGANIC OXIDE PARTICLES, AND DISPLAY DEVICE INCLUDING THE OPTICAL FILTER

(71) Applicant: Samsung Display Co., Ltd., Yongin-si (KR)

(72) Inventors: Sung Yong Kang, Yongin-si (KR); Seung Beom Park, Yongin-si (KR); Beong Hun Beon, Yongin-si (KR)

(73) Assignee: Samsung Display Co., Ltd. (KR)

( * ) Notice: Subject to any disclaimer, the term of this patent is extended or adjusted under 35 U.S.C. 154(b) by 315 days.

(21) Appl. No.: 15/867,404

(22) Filed: Jan. 10, 2018

(65) Prior Publication Data

US 2018/0196313 A1    Jul. 12, 2018

(30) Foreign Application Priority Data

Jan. 10, 2017 (KR) .................. 10-2017-0003481

(51) Int. Cl.
*G02F 1/1335* (2006.01)
*G02F 1/13357* (2006.01)
*G02B 5/20* (2006.01)

(52) U.S. Cl.
CPC ....... *G02F 1/133617* (2013.01); *G02B 5/201* (2013.01); *G02F 1/133514* (2013.01); *G02F 1/133512* (2013.01); *G02F 1/133528* (2013.01); *G02F 2001/133521* (2013.01); *G02F 2001/133562* (2013.01)

(58) Field of Classification Search
CPC .......... G02B 5/206; G02B 5/207; G02B 5/26; G02B 5/285; G02B 5/286; G02B 5/287; G02B 27/1006; G02B 27/142; G02B 27/145; G02F 1/133514; G02F 1/133516; G02F 1/133519; G02F 1/133521; G02F 1/133617
USPC .................... 349/106; 359/491.01, 580–590
See application file for complete search history.

(56) References Cited

U.S. PATENT DOCUMENTS 9,599,856 B2    3/2017 Lee et al.
2005/0264715 A1*  12/2005 Kahen ............... G02F 1/133617
                                                    349/61
2006/0007373 A1*  1/2006 Arai ....................... G02B 5/201
                                                    349/113

(Continued)

FOREIGN PATENT DOCUMENTS

CN    102356348 A    2/2012
CN    105242340 A    1/2016

(Continued)

OTHER PUBLICATIONS

Chinese Office Action Report, Application No. 201810021683.7 dated Feb. 10, 2021, 6 pages.

*Primary Examiner* — Ryan S Dunning
(74) *Attorney, Agent, or Firm* — Innovation Counsel LLP

(57) ABSTRACT

According to one embodiment of the present disclosure, an optical filter which makes light pass therethrough includes a first layer configured to polarize the light; a second layer disposed directly on a first surface of the first layer and to make only light with a first wavelength band pass therethrough; and a color conversion layer disposed on the first layer, to receive the light, and to convert the light with the first wavelength band into light with a second wavelength band.

11 Claims, 6 Drawing Sheets

(56) References Cited

U.S. PATENT DOCUMENTS

| | | | |
|---|---|---|---|
| 2007/0109649 A1* | 5/2007 | Chen E. Shang | G02B 5/288 359/588 |
| 2007/0236628 A1* | 10/2007 | Epstein | G02B 5/0242 349/67 |
| 2012/0019740 A1 | 1/2012 | Kadowaki et al. | |
| 2012/0227809 A1 | 9/2012 | Bharti et al. | |
| 2016/0041317 A1* | 2/2016 | Kim | G02B 5/0215 359/891 |
| 2016/0146989 A1 | 5/2016 | Sakat et al. | |
| 2016/0148963 A1 | 5/2016 | Creazzo et al. | |
| 2016/0306226 A1 | 10/2016 | Yoon et al. | |

FOREIGN PATENT DOCUMENTS

| | | |
|---|---|---|
| JP | 2016-26323 A | 2/2016 |
| KR | 10-2015-0137722 A | 12/2015 |
| KR | 10-2016-0015480 A | 2/2016 |

\* cited by examiner

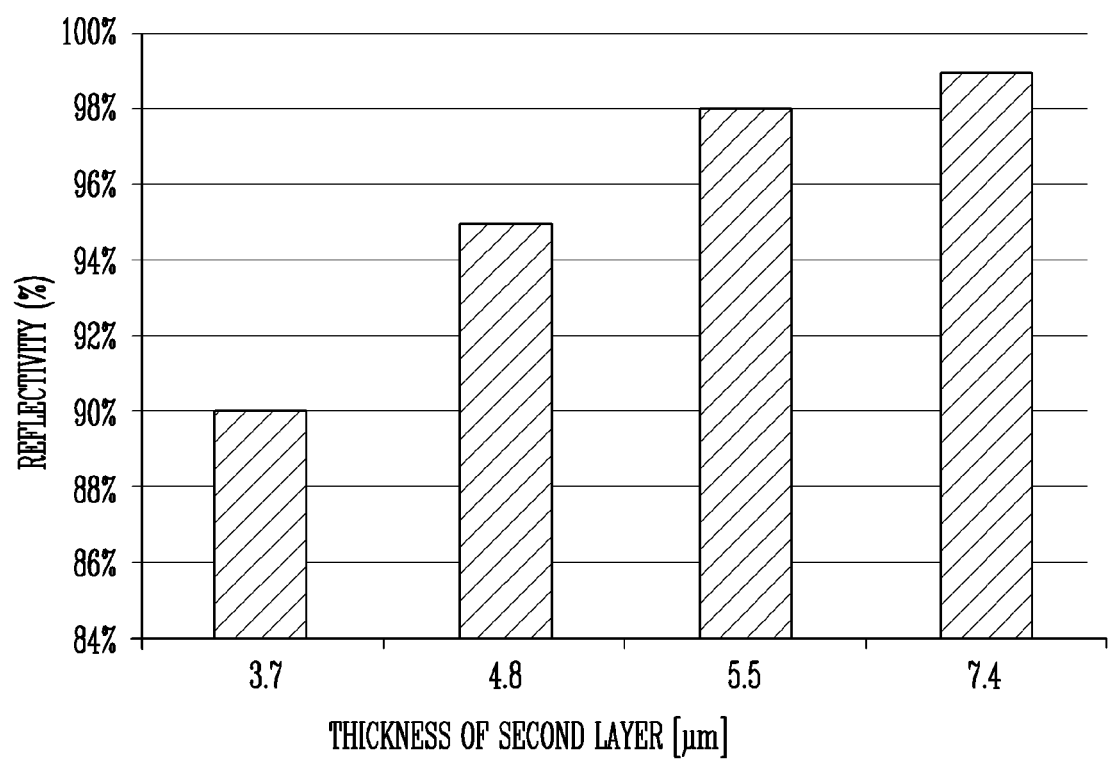

OPTICAL FILTER HAVING METAL OXIDE PARTICLES AND NON-METAL INORGANIC OXIDE PARTICLES, AND DISPLAY DEVICE INCLUDING THE OPTICAL FILTER

RELATED APPLICATIONS

This application claims priority to and the benefit of Korean Patent Application No. 10-2017-0003481, filed on Jan. 10, 2017, in the Korean Intellectual Property Office, the entire contents of which are incorporated herein by reference in their entirety.

BACKGROUND

1. Field

An exemplary embodiment according to the concept of the present disclosure relates to an optical filter and a display device including the optical filter.

2. Description of the Related Art

In general, a liquid crystal display (LCD) is a display device which obtains a desired image signal by applying an electric field with adjusted intensity to liquid crystal with anisotropic dielectric constant formed between two substrates and by adjusting the amount of light which is incident on the substrate. The liquid crystal display includes two substrates, a liquid crystal layer formed therebetween, a backlight unit which emits light to the liquid crystal layer, and the like.

SUMMARY OF THE INVENTION

An exemplary embodiment of the present disclosure is to provide an optical filter having a new structure.

According to a first embodiment of the present disclosure, an optical filter which makes light pass therethrough includes a first layer configured to polarize the light; a second layer disposed directly on a first surface of the first layer and to make only light with a first wavelength band pass therethrough; and a color conversion layer disposed on the first layer, to receive the light, and to convert the light with the first wavelength band into light with a second wavelength band.

According to the first embodiment of the present disclosure, the first wavelength band may be 440 nm to 480 nm.

According to the first embodiment of the present disclosure, the second layer may reflect light with a wavelength of 500 nm to 680 nm.

According to the first embodiment of the present disclosure, the second layer may include at least one first refraction layer with a first refractive index and at least one second refraction layer with a second refractive index.

According to the first embodiment of the present disclosure, each of the number of the first refraction layers and the number of the second refraction layers may be from five layers to ten layers.

According to the first embodiment of the present disclosure, the second layer may include the first refraction layer and the second refraction layer which are alternately stacked.

According to the first embodiment of the present disclosure, the first refractive index may be larger than the second refractive index.

According to the first embodiment of the present disclosure, a thickness of the first refraction layer may be smaller than a thickness of the second refraction layer.

According to the first embodiment of the present disclosure, the second layer may include a first reflection layer which reflects light with a third wavelength band and a second reflection layer which reflects light with a fourth wavelength band.

According to the first embodiment of the present disclosure, the third wavelength band may be 590 nm to 680 nm, and the fourth wavelength band may be 500 nm to 590 nm.

According to the first embodiment of the present disclosure, each of the first reflection layer and the second reflection layer may include at least one first reflection sub-layer and at least one the second reflection sub-layer.

According to the first embodiment of the present disclosure, thicknesses of the first reflection sub-layer and the second reflection sub-layer which are included in the first reflection layer may be larger than thicknesses of the first reflection sub-layer and the second reflection sub-layer which are included in the second reflection layer.

According to the first embodiment of the present disclosure, a thickness of the first reflection layer may be larger than a thickness of the second reflection layer.

According to the first embodiment of the present disclosure, the color conversion layer may include a quantum dot.

According to a second embodiment of the present disclosure, a display device includes a light source configured to emit light; a display panel configured to be provided on the light source; and an optical filter configured to be provided on the display panel. The optical filter which makes the light pass therethrough includes a first layer configured to polarize the light; a second layer disposed directly on a first surface of the first layer and to make only light with a first wavelength band pass therethrough; and a color conversion layer disposed on the first layer, to receive the light, and to convert the first wavelength band into a second wavelength band.

According to the second embodiment of the present disclosure, the light source may emit light with a wavelength of 440 nm to 480 nm.

According to the second embodiment of the present disclosure, the second layer may include at least one first refraction layer with a first refractive index and at least one second refraction layer with a second refractive index.

According to the second embodiment of the present disclosure, the second layer may include the first refraction layer and the second refraction layer which are alternately stacked, and the first refractive index may be larger than the second refractive index.

According to the second embodiment of the present disclosure, the second layer may include a first reflection layer which reflects light with a third wavelength band and a second reflection layer which reflects light with a fourth wavelength band.

According to the second embodiment of the present disclosure, each of the first reflection layer and the second reflection layer may include at least one first reflection sub-layer and at least one the second reflection sub-layer.

According to one embodiment, an optical filter having a new structure is provided, and thus, it is possible to provide a clearer image.

Effects of the present disclosure are not limited to the aforementioned effects, and may be variously extended in a range without departing from the spirit and scope of the present disclosure.

BRIEF DESCRIPTION OF THE DRAWINGS

FIG. 5 is a graph illustrating reflectivity corresponding to a thickness of the second layer according to the one embodiment of the present disclosure.

DETAILED DESCRIPTION OF THE EMBODIMENT

Figure 1:
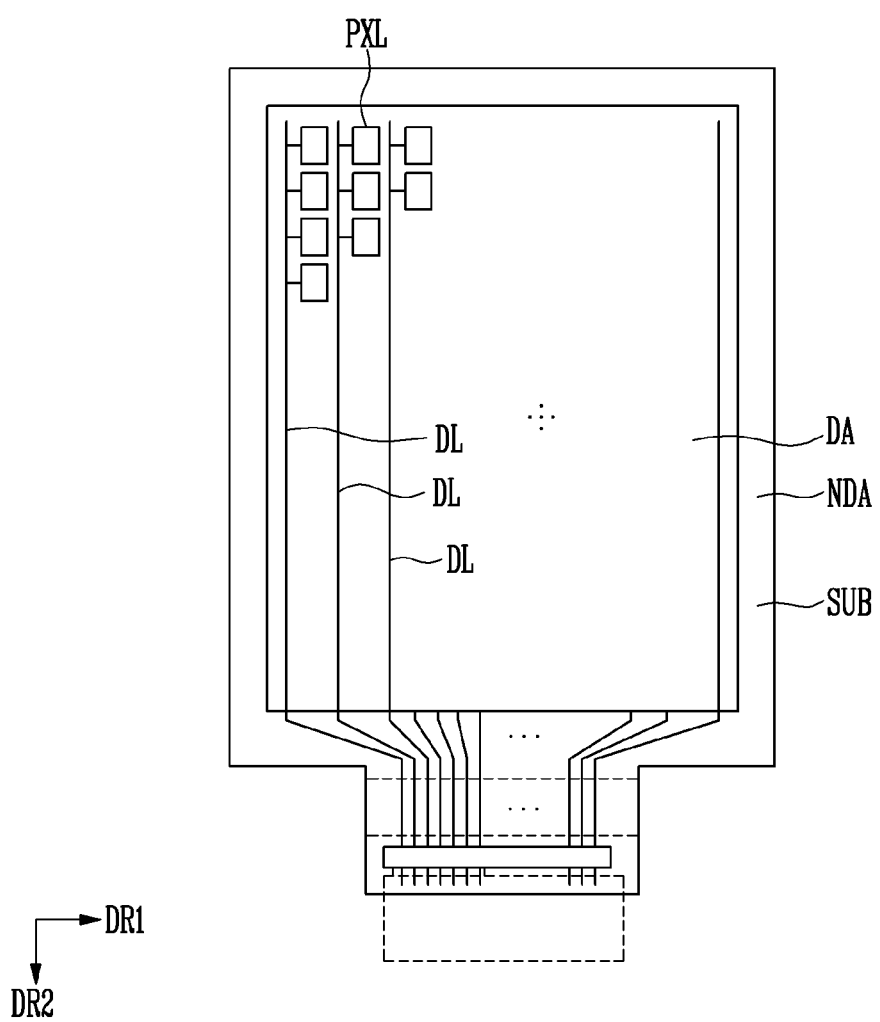
FIG. 1 is a plan view of a display device according to one embodiment of the present disclosure.

The present disclosure can be modified in various types and have various forms. Accordingly, specific embodiments will be described in detail with reference to drawings. This is not intended to limit the present disclosure to a specific disclosure form, and the present disclosure should be understood to include every change, equivalent, and replacement included in the spirit and the technical scope of the present disclosure.

Similar reference numerals will be attached to similar configuration elements with reference to each figure. In the accompanied drawings, the dimensions of structures are enlarged than real for clarity of the present disclosure. Words such as first and second can be used for explaining various configuration elements, but the configuration elements should not be limited to the words. The words can be used only for the purpose of distinguishing one configuration element from other configuration elements. For example, a first configuration element can be referred to as a second configuration element in a range without departing from the scope of the present disclosure, and similarly, the second configuration element can be referred to as the first configuration element. A singular form includes a plural form, as long as the singular form does not clearly indicate other meaning contextually.

In the present application, it should be understood that words such as "include" and "have" are used for designating that characteristics, numbers, steps, operations, configuration elements, components, or a combination thereof which are described in the present specification exist, and existence or a possibility of addition of one or more other characteristics, numbers, steps, operations, configuration elements, components, or a combination thereof are not excluded in advance. In addition, in a case where a portion such as a layer, a film, an area, or a plate is over another portion, this includes not only a case where the portion is on another portion, but also a case where the portion is over another portion through a certain member. In addition, in the present specification, in a case where it is described that the portion such as a layer, a film, an area, or a plate is formed on another portion, this includes that the portion is formed in not only an upstream direction but also a lateral direction or a downstream direction. In contrast to this, in a case where a portion such as a layer, a film, an area, or a plate is under another portion, this includes not only a case where the portion is beneath another portion, but also a case where the portion is under another portion through a certain member.

In the present specification, an "upper" and a "lower" are used as a relative concept for easily understanding a technical idea of the present disclosure. Thus, the "upper" and the "lower" do not indicate specific directions, locations, or configuration elements and can be compatible with each other. For example, the "upper" can be interpreted as the "lower", and in contrast, the "lower" can be interpreted as the "upper". Thus, the "upper" can be referred to as a "first" and the "lower" can be referred to as a "second". In contrast to this, the "lower" can be referred to as a "first" and the "upper" can be referred to as a "second". However, the "upper" and the "lower" are not used together within one embodiment.

FIG. 1 is a plan view of a display device according to an embodiment of the present disclosure.

As illustrated in FIG. 1, the display device according to the one embodiment of the present disclosure includes a substrate SUB, a plurality of pixels PXL which are provided on the substrate SUB, and a wiring portion which is connected to the pixels PXL.

The substrate SUB includes a display area DA and a non-display area NDA which is provided on at least one side of the display area DA.

The substrate SUB may have a substantially quadrangular shape, and in particular, have a substantially rectangular shape. In the one embodiment of the present disclosure, the substrate SUB may include a pair of short sides parallel to each other in a first direction DR1 and a pair of long sides parallel to each other in a second direction DR2.

However, the shape of the substrate SUB is not limited to this, and may be formed in various types. For example, the substrate SUB may be configured with any one of various shapes, such as a closed polygon including a straight side, a circle or an ellipse configured by a curved line, and a semi-circle or a semi-ellipse including a straight line and a curved line. In the one embodiment of the present disclosure, if the substrate SUB has straight sides, at least a portion of a corner of each shape may be configured by the curved line. For example, if the substrate SUB has a rectangular shape, a portion where adjacent straight sides meet may be replaced with a curved line with a predetermined curvature. That is, a vertex portion of a rectangular shape may be configured with a curved side in which adjacent both ends are connected to adjacent two straight sides and which has a predetermined curvature. The curvature may be set differently depending on a location. For example, the curvature may be set differently depending on a location where a curved line starts, a length of the curved line, and the like.

The display area DA is an area where a plurality of pixels PXL are provided to display an image. The display area DA may be provided to have a shape corresponding to a shape of the substrate SUB. For example, the display area DA may be configured with any one of various shapes, such as a closed polygon including a straight side, a circle or an ellipse configured by a curved line, and a semi-circle or a semi-ellipse including a straight line and a curved line, in the same manner as the shape of the substrate SUB. In the one embodiment of the present disclosure, if the display area DA has straight sides, at least a portion of a corner of each shape may be configured by the curved line.

The pixels PXL are provided on the display area DA of the substrate SUB. Each pixel PXL is a minimum unit for displaying an image and may be plural. The pixels PXL may emit white light and/or color light. Each pixel PXL may emit any one of red light, green light, and blue light, but is not limited to this, and may emit cyan light, magenta light, yellow light, or the like.

Figure 2:
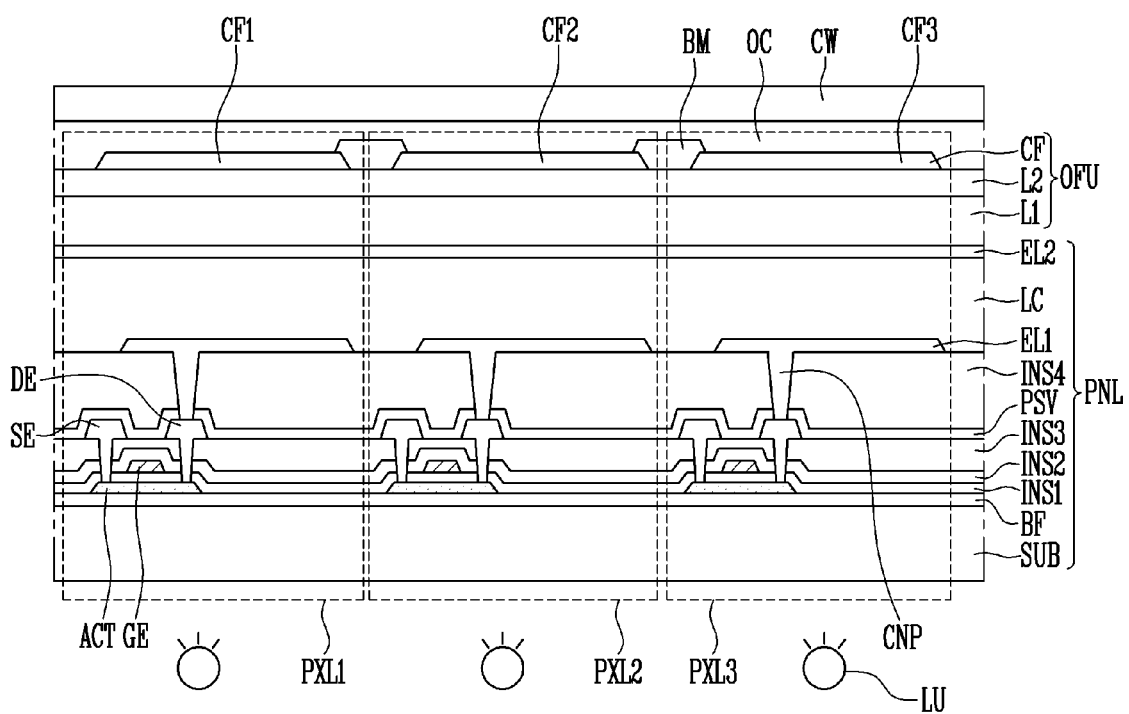
FIG. 2 is a cross-sectional view of the display device according to the one embodiment of the present disclosure.

FIG. 2 is a cross-sectional view of the display device according to the one embodiment of the present disclosure.

The display device according to the one embodiment of the present disclosure may include a light source LU, a display panel PNL which is provided on the light source LU, and an optical filter OFU which is provided on the display panel PNL.

The display panel PNL may receive light which is emitted by the light source LU to output an image. Thus, the display panel PNL according to the one embodiment of the present disclosure is a light receiving type. The display panel PNL of a light receiving type includes a liquid crystal type including liquid crystal, an electrophoresis type, an electrowetting type, and the like. The one embodiment of the present disclosure will describe on a display device including a liquid crystal type display panel.

The substrate SUB may be configured with an insulating material such as glass, or resin. In addition, the substrate SUB may be configured with a material with flexibility which can be bent or folded, and may have a single layer or a multilayer structure.

For example, the substrate SUB may contain at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, cellulose acetate propionate, and polyurethane. However, a material configuring the substrate SUB may change variously, and may also be configured with fiber reinforced plastic (FRP) and the like.

A buffer layer BF is disposed on the substrate SUB. The buffer layer BF protects switching and driving transistors against diffusion of impurity. The buffer layer BF may be configured with a single layer and may be configured with a multilayer having at least two layers.

The buffer layer BF may be an inorganic insulating film configured with an inorganic material. For example, the buffer layer BF may be formed of silicon nitride, silicon oxide, silicon oxynitride, or the like. If the buffer layer BF is a multilayer, each layer may be formed of the same material or may be formed of materials different from each other. The buffer layer BF may be omitted depending on a material or process conditions of the substrate SUB.

An active pattern ACT is provided on the buffer layer BF. The active pattern ACT is formed of a semiconductor material. The active pattern ACT may include a source area, a drain area, and a channel area which is provided between the source area and the drain area. The active pattern ACT may be a semiconductor pattern configured with polysilicon, amorphous silicon, an oxide semiconductor, or the like. The channel area is a semiconductor pattern which is not doped with impurity, and may be an intrinsic semiconductor. The source area and the drain area may have semiconductor patterns which are doped with impurity. Impurity such as n-type impurity, p-type impurity, or a metal may be used as the impurity.

A first insulating film INS1 may be provided on the active pattern ACT. The first insulating film INS1 may be an inorganic insulating film configured with an inorganic material, and may be an organic insulating film configured with an organic material. An inorganic insulating material such as polysiloxane, silicon nitride, silicon oxide, and silicon oxynitride may be used as the inorganic material. The organic material may be an organic insulating material such as a polyacryl-based compound, a polyimide-based compound, a fluoro-based carbon compound such as Teflon, and a benzocyclobutene compound.

A gate electrode GE is provided on the first insulating film INS1. The gate electrode GE is formed to cover an area corresponding to the channel area of the active pattern ACT.

The gate electrode GE may be configured with a metal. For example, the gate electrode GE may be configured with at least one of metals such as gold (Au), silver (Ag), aluminum (Al), molybdenum (Mo), chromium (Cr), titanium (Ti), nickel (Ni), neodymium (Nd), and copper (Cu), or an alloy of metals. In addition, the gate electrode GE may be formed of a single film, but is not limited to this, and may be formed of a multilayer in which two or more of the metals and alloy are stacked.

In the one embodiment of the present disclosure, other wires such as gate wires may be provided on the same layer as the gate electrode GE and as the same material as the gate electrode GE, which are not illustrated. Here, other wires such as the gate wires may be directly or indirectly connected to a part of transistors in each pixel PXL1, PXL2, and PXL3, for example, the gate electrode GE.

A second insulating layer INS2 is provided on the gate electrode GE. The second insulating layer INS2 may be an inorganic insulating layer configured with an inorganic material. Polysiloxane, silicon nitride, silicon oxide, silicon oxynitride, or the like may be used as the inorganic material.

A third insulating layer INS3 is provided on the second insulating layer INS2. The third insulating layer INS3 may be an inorganic insulating layer configured with an inorganic material. Polysiloxane, silicon nitride, silicon oxide, silicon oxynitride, or the like may be used as the inorganic material.

A source electrode SE and a drain electrode DE are provided on the third insulating layer INS3. The source electrode SE and the drain electrode DE are respectively in contact with the source area and the drain area of the active pattern ACT through contact holes formed in the third insulating layer INS3, the second insulating layer INS2, and the first insulating film INS1.

The source electrode SE and the drain electrode DE may be configured with metals. For example, each of the source electrode SE and the drain electrode DE may be configured with at least one of metals such as gold (Au), silver (Ag), aluminum (Al), molybdenum (Mo), chromium (Cr), titanium (Ti), nickel (Ni), neodymium (Nd), and copper (Cu), or an alloy of metals. In addition, each of the source electrode SE and the drain electrode DE may be formed of a single film, but is not limited to this, and may be formed of a multilayer in which two or more of the metals and alloy are stacked.

In the one embodiment of the present disclosure, data wires or first power supply wires may be provided on the same layer as the source electrode SE and the drain electrode DE, and as the same material as the source electrode SE and the drain electrode DE, which are not illustrated. Here, the data wires and the first power supply wires may be directly or indirectly connected to a part of transistors in each pixel PXL, for example, the source electrode SE and/or the drain electrode DE.

A passivation layer PSV may be provided on the source electrode SE and the drain electrode DE. The passivation layer PSV may be an inorganic insulating layer configured with an inorganic material. Polysiloxane, silicon nitride, silicon oxide, silicon oxynitride, or the like may be used as the inorganic material. The passivation layer PSV may be omitted depending on the embodiments.

A fourth insulating layer INS4 may be provided on the passivation layer PSV. If the passivation layer PSV is omitted, the fourth insulating layer INS4 may be provided on the third insulating layer INS3.

The fourth insulating layer INS4 may be an organic insulating layer configured with an organic material. An organic insulating material such as a polyacryl-based compound, a polyimide-based compound, a fluoro-based carbon compound such as Teflon, and a benzocyclobutene compound may be used as the organic material.

A connection pattern CNP may be provided on the fourth insulating layer INS4. The connection pattern CNP is connected to the drain electrode DE of a transistor through a contact hole passing through the fourth insulating layer INS4 and the passivation layer PSV. The connection pattern CNP may be configured with at least one of metals such as gold (Au), silver (Ag), aluminum (Al), molybdenum (Mo), chromium (Cr), titanium (Ti), nickel (Ni), neodymium (Nd), and copper (Cu), or an alloy of metals. In addition, the connection pattern CNP may be formed of a single film, but is not limited to this, and may be formed of a multilayer in which two or more of the metals and alloy are stacked.

In the one embodiment of the present disclosure, other wires such as dummy power supply wires may be provided on the same layer as the connection pattern CNP and as the same material as the connection pattern CNP, which are not illustrated.

A first electrode EL1 may be provided on the fourth insulating layer INS4. The first electrode EL1 is connected to the drain electrode DE of each pixel PXL1, PXL2, and PXL3 through the connection pattern CNP. The first electrode EL1 may be formed of a transparent conductive material. For example, the first electrode EL1 may be formed of transparent conductive polymer, transparent conductive oxide, or the like. Indium tin oxide (ITO), indium zinc oxide (IZO), indium tin zinc oxide (ITZO), and the like may be used for the transparent conductive oxide.

The connection pattern CNP and the first electrode EL1 may be formed thorough a same process using the same material, for example, transparent conductive polymer, transparent conductive oxide, or the like.

A liquid crystal layer LC may be provided on the first electrode EL1. Liquid crystal molecules contained in the liquid crystal layer LC are driven by an electric field which is applied to the liquid crystal layer LC. Specifically, liquid crystal molecules with dielectric anisotropy may be aligned in a specific direction by the electric field which is applied to the liquid crystal layer LC. There is no particular limitation on the liquid crystal layer LC which can be used for the display device according to the one embodiment of the present disclosure, and liquid crystal compositions. Thus, the display device according to the present disclosure may be a liquid crystal display device of various modes. For example, the display device may be a display device of a vertical alignment (VA) mode, a fringe field switching (FFS) mode, an in plane switching (IPS) mode, a plane to light switching (PLS) mode, or the like. The liquid crystal components may have negative dielectric anisotropy or positive dielectric anisotropy in accordance with a drive mode of the display device. If the liquid crystal components have the negative dielectric anisotropy, the display device may be a liquid crystal display device of a vertical alignment mode. In this case, the display device may be a display device of a multi-domain vertical alignment (MVA) mode, a patterned vertical alignment (PVA), and a polymer stabilized vertical alignment (PS-VA) in particular. If the liquid crystal components may have positive dielectric anisotropy, the display device may be a display device of a horizontal alignment mode.

An alignment film for aligning the liquid crystal molecules in the liquid crystal layer LC may be further provided on an upper portion or a lower portion of the liquid crystal layer LC. The alignment film aligns the liquid crystal molecules in a specific direction to allow rotation of the liquid crystal molecules in a predetermined direction when the electric field is applied to the liquid crystal layer LC. In addition, a sealing material may be further provided along a circumference of the liquid crystal layer LC. The sealing material seals the liquid crystal layer LC to prevent the liquid crystal layer LC from flowing out.

A second electrode EL2 may be provided on the liquid crystal layer LC. The second electrode EL2 may be disposed to have a predetermined distance from the first electrode EL1 and the liquid crystal layer LC is interposed between the first electrode EL1 and the second electrode EL2. The second electrode EL2 may be formed on a first layer L1. The first electrode EL1 and the second electrode EL2 may be respectively a pixel electrode and a common electrode. In FIG. 1, the first electrode EL1 is illustrated as the pixel electrode and the second electrode EL2 is illustrated as the common electrode. However, FIG. 1 is only an example of the present disclosure. Differently from FIG. 1, the first electrode EL1 may be the common electrode and the second electrode EL2 may be the pixel electrode. If the second electrode EL2 is the common electrode, the second electrode EL2 may be formed over a plurality of pixels PXL1, PXL2, and PXL3.

Voltages may be applied to the first electrode EL1 and the second electrode EL2 so as to apply an electric field to the liquid crystal layer LC. If the first electrode EL1 is the pixel electrode and the second electrode EL2 is the common electrode, different voltages may be applied to the first electrode EL1. The liquid crystal molecules with dielectric anisotropy in the liquid crystal layer LC rotate in accordance with the voltage applied to the first electrode EL1. The liquid crystal molecules also have refractive index anisotropy, and thus, light being emitted from the light source LU may pass through or may not pass through the liquid crystal layer LC in accordance with a state of alignment by rotation of the liquid crystal molecules in the liquid crystal layer LC.

The second electrode EL2 may be formed of a transparent conductive material. For example, the second electrode EL2 may be formed of transparent conductive polymer, transparent conductive oxide, or the like. The transparent conductive oxide may be used for indium tin oxide (ITO), indium zinc oxide (IZO), indium tin zinc oxide (ITZO), and the like.

The optical filter OFU may be provided on the display panel PNL. According to the one embodiment of the present disclosure, the optical filter OFU includes the first layer L1 which polarizes light, a second layer L2 which is applied onto one surface of the first layer L1 and makes only light with a first wavelength band pass therethrough, and a color conversion layer CF which is provided on the second layer L2 and receive light to convert the first wavelength band into a second wavelength band.

The first layer L1 may be provided on the second electrode EL2 of the display panel PNL. The first layer L1 polarizes light which is emitted from the light source LU. The first layer L1 may include a protection layer and a polarizer. In addition, the first layer L1 may further include a phase retardation film.

The protection layer may contain a polymer compound. For example, the protection layer may contain copolymer of aromatic vinyl monomer, unsaturated carboxylic acid monomer, and unsaturated dicarboxylic anhydride monomer. The aromatic vinyl monomer may increase water resistance of the protection layer. Particularly, the aromatic vinyl monomer may be a styrene compound. For example, the styrene compound may contain alkyl-substituted styrenes such as α-methylstyrene, β-methylstyrene and p-methylstyrene; halogen-substituted styrenes such as 4-chlorostyrene and 4-bromostyrene; hydroxystyrenes such as p-hydroxystyrene, α-methyl-p-hydroxystyrene, 2-methyl-4-hydroxystyrene and 3,4-dihydroxystyrene; vinylbenzyl alcohols; alkoxy-substituted styrenes such as p-methoxystyrene, p-tert-butoxystyrene and m-tert-butoxystyrene; vinylbenzoic acid such as 3-vinylbenzoic acid and 4-vinylbenzoic acid; 4-vinylbenzyl acetate; 4-acetoxystyrene; amidostyrenes such as 2-butylamidostyrene, 4-methylamidostyrene, and p-sulfonamidostyrene; aminostyrenes such as 3-aminostyrene, 4-aminostyrene, 2-isopropenyl aniline and vinyl benzyl dimethyl amine; nitrostyrenes such as 3-nitrostyrene and 4-nitrostyrene; cyanostyrenes such as 3-cyanostyrene and 4-cyanostyrene; vinylphenylacetonitrile; aryl styrenes such as phenyl styrene, and the like.

For example, the unsaturated carboxylic acid monomer may contain acrylic acid, acetylenicarboxylic acid, 1-adamantanecarboxylic acid, benzoic acid, disodium benzoate, 9-anthracenecarboxylic acid, isopentanoic acid, isobutyric acid, undecanoic acid, 10-undecanoic acid, 4-ethylbenzoic acid, ethyl oleic acid, 2-ethylhexanoic acid, 2-ethylbutyric acid, octanoic acid, formic acid, crotonic acid, cinnamic acid, acetic acid, tetramethyl ammonium acetate, cyclobutane carboxylic acid, cyclopropane carboxylic acid, cyclopropyl acetic acid, cyclohexane carboxylic acid, cyclopentane carboxylic acid, diphenylacetic acid, 2,4-dimethylbenzoic acid, 2,6-dimethylbenzoic acid, 3,4-dimethylbenzoic acid, 3,5-dimethylbenzoic acid, stearic acid, thylic acid, decanoic acid, 2,4,6-trimethylbenzoic acid, o-tolylacetic acid, 2-(4-toluoyl) benzoic acid, 1-naphthoic acid, 2-naphthoic acid, 1-naphthoic acid, 2-naphthoic acid, nonanoic acid, palmitic acid, 4-vinylbenzoic acid, vinyl acetic acid, 4-biphenylyl acetic acid, biphenyl-2-carboxylic acid, biphenyl-4-carboxylic acid, pivalic acid, 4-(1-pyrenyl)-butyric acid, phenyl acetylene carboxylic acid, 2-phenylpropionic acid, 3-phenylpropionic acid, 4-phenylbutyric acid, 9-fluorenecarboxylic acid, 4-t-butylbenzoic acid, 4-t-butylcyclohexanecarboxylic acid, propionic acid, 2-propylvaleric acid, hexanoic acid, heptanoic acid, pentadecanoic acid, pentanoic acid, 4-pentenoic acid, trans-2-pentenoic acid, myristic acid, methacrylic acid, 2-methylbenzoic acid, 3-methylbenzoic acid, 4-methylbenzoic acid, 2-methylvaleric acid, 2-methylvaleric acid, 4-methylvaleric acid, 4-methyl cinnamic acid, 3-methylpentanoic acid, 2-methylbutyric acid, lauric acid, and the like.

For example, the unsaturated dicarboxylic anhydride monomer contains maleic anhydride, maleic anhydride, methyl maleic anhydride, 1,2-dimethyl maleic anhydride, ethyl maleic anhydride, phenyl maleic anhydride, bromomaleic anhydride, itaconic anhydride, aconitic anhydride, glutaconic anhydride, succinic anhydride, fumaric anhydride, citraconic anhydride, mesaconic anhydride, 2-pentene dianhydride, methylenesuccinic anhydride, allyl malonic anhydride, isopropylidene succinic anhydride, 2,4-hexadiene dianhydride, acetylene dicarboxylic acid anhydride, and the like.

The compounds may be copolymerized. Copolymer containing the compounds may be formed by using a method, for example, radical solution polymerization which is obtained by using heat or initiator, radical suspension polymerization, radical emulsion polymerization, anionic polymerization which is obtained by using organometallic compound, coordination anionic polymerization which uses transition metal complex, cationic polymerization which uses Lewis acid, or the like.

The polarizer is a film which polarizes natural light or polarized light in a specific direction. For example, the polarizer may convert the natural light into a specific linear polarized light. A film which is obtained by adsorbing a dichroic substance such as iodine or a dichroic dye to a hydrophilic polymer film such as a polyvinyl alcohol film, a partially formalized polyvinyl alcohol film, or an ethylene-vinyl acetate copolymerization-based partially-saponified film; a polyene-based oriented film such as dehydrated water of phyllovinyl alcohol or a dehydrochloric acid-treated product of polyvinyl chloride; or the like may be used as the polarizer. However, aforementioned films are only examples.

The polarizer may include a quantum dot. The quantum dot is semiconductor nanoparticles, and has quantum confinement effect. The quantum dot has a diameter of several nm to several tens nm, and a wavelength of light which is emitted from the quantum dot may change depending on a size of the particle. Specifically, light is emitted by transition of electrons in an excited state from a conduction band to a valence band, and the shorter the quantum dot is, light having the shorter wavelength is emitted. A width of the wavelength of the light which is emitted from the quantum dot is relatively narrow. The quantum dot may include a si-based quantum dot, a II-VI group compound semiconductor quantum dot, a III-V group compound semiconductor quantum dot, a IV-VI group compound semiconductor quantum dot, and any one quantum dot of mixtures thereof. The II-VI group compound semiconductor quantum dot may contain at least one selected from a group configured with CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HggZnTe, CdZnSeS, CdZnSeTe, CdZnSTe, CdHgSeS, CdHgSeTe, CdHgSTe, HgZnSeS, HgZnSeTe, and HgZnSTe. The III-V group compound semiconductor quantum dot may contain at least one selected from a group configured with GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs. The IV-VI group compound semiconductor quantum dot may contain SbTe.

As described above, the smaller a size of the particle of the quantum dot is, light with the shorter wavelength is emitted. For example, red light may be emitted from the quantum dot with a size of 55 to 65 Å, green light may be emitted from the quantum dot with a size of 40 to 50 Å, and blue light may be emitted from the quantum dot with a size of 20 to 35 Å. The quantum dot may emit light with a narrow wavelength band in accordance with a size of the particle. Optical efficiency of the polarizer and the first layer L1 can be increased by using the quantum dot.

A fabricating method of the first layer L1 according to the one embodiment of the present disclosure may include a step of preparing a polyvinyl alcohol-based film, a step of dyeing and crosslinking an iodine or dichroic dye to the polyvinyl alcohol-based film, and a step of arranging quantum dots in the polyvinyl alcohol-based film. However, other films may be used as the polarizer, instead of the polyvinyl alcohol-based film. A type of the films which can be used as the polarizer is as described above.

Dyeing is a process of adsorbing iodine, dye which is a dichroic material, pigment, or a mixture thereof to the inside of a polyvinyl alcohol-based film. The iodine, the dye, or the pigment absorbs light vibrating in a stretching direction of the polarizer, makes light vibrating in a vertical direction passing through, and thereby, polarized light vibrating in a specific direction can be obtained.

Dyeing may be performed by impregnating a stacked film in which a polyvinyl alcohol-based film or a polyvinyl alcohol-based film is laminated on a substrate into an iodine solution or a dichroic material solution. A case where dyeing is performed by using iodine will be described as an example. Temperature of the iodine solution may be in a range of 20° C. to 50° C., and impregnation time may be in a range of 10 to 300 sec. If an iodine aqueous solution is used as the iodine solution, an aqueous solution containing iodine ($I_2$) and iodine ion, for example, potassium iodide (KI) which is used as a dissolution supplement agent may be used. In an exemplary embodiment, concentration of the iodine ($I_2$) may be in a range of 0.01 weight % to 0.5 weight % on the basis of the total weight of the aqueous solution, and concentration of the potassium iodide (KI) may be in a range of 0.01 weight % to 10 weight % on the basis of the total weight of the aqueous solution.

A step of swelling may be performed before dyeing is performed. In the step of swelling, a dichroic substance is uniformly dyed into the inside of the polyvinyl alcohol-based film during the dyeing process by softening molecular chain of the polyvinyl alcohol-based film and by relaxing the molecular chain, and thereby, preventing stain from occurring. The polyvinyl alcohol-based film may be stretched in the swelling process. In the exemplary embodiment, the swelling process may be performed by using a wetting method in a swelling tank where swelling liquid is contained. In addition, average temperature may change depending on a thickness of a film or the like, and may be in a range of, for example, 15° C. to 40° C. A crosslinking process may be performed after the dyeing step. If molecules of iodine or a dichroic substance are dyed onto the polyvinyl alcohol-based film in the dyeing step, the dichroic molecules are adsorbed onto a polymer matrix of the polyvinyl alcohol-based film by using boric acid, borate, and the like. For example, the crosslinking method includes an immersing method of immersing the polyvinyl alcohol-based film into a boric acid aqueous solution or the like, but is not limited to this. The crosslinking process may be performed by using a coating method or a spraying method of coating a film with a solution or of spraying the solution onto the film.

Meanwhile, a step of arranging the quantum dots in the polyvinyl alcohol-based film may be performed at the same time as the steps of dyeing and crosslinking, and may be performed by coating an upper portion of the polyvinyl alcohol-based film with distributed solvent in which the quantum dots are distributed. However, the step of arranging the quantum dots is not limited to this, and may be performed by impregnating the polyvinyl alcohol-based film into the distributed solution in which the quantum dots are distributed, or the quantum dots may be included in the polyvinyl alcohol-based film by injecting the quantum dots into the iodine solution, the dichroic substance solution, boric acid aqueous solution, or the like in the dyeing step or the crosslinking step.

Next, a step of stretching the polyvinyl alcohol-based film may be included. The stretching step may be performed by using a wet stretching method and/or a dry stretching method known in the art in which the polyvinyl alcohol-based film is stretched. An unlimited example of the dry stretching method may include an inter-roll stretching method, a heating roll stretching method, a pressing stretching method, a tenter stretching method, and the like, and an unlimited example of the set stretching method may include the tenter stretching method, the inter-roll stretching method, and the like. In addition, in a case of the wet stretching method, a film may be stretched in alcohols, water, or a boric acid aqueous solution, and for example, a solvent such as methyl alcohol and propyl alcohol may be used, but is not limited to this. Stretching temperature and time may be used by being appropriately selected depending on a material of the film, a desired stretching rate, a method which is used, and the like. In addition, the stretching step may use uniaxial stretching or biaxial stretching. The dyeing step and the stretching step need not always be performed sequentially. An appropriate sequence may be selectively performed depending on process equipment and facilities, and in some cases, the stretching step may be performed at the same time as the dyeing step or the crosslinking step. If the stretching step is performed at the same time as the dyeing step, the stretching step may be performed in the iodine solution. Meanwhile, if the stretching step is performed at the same time as the crosslinking step, the stretching step may be performed in the boric acid aqueous solution. In addition, at the same time as this, the quantum dots may be included in the polyvinyl alcohol-based film together with the dyeing, crosslinking, and stretching steps, since the quantum dots are included in the iodine solution or the boric acid aqueous solution.

The second layer L2 is coated on the first layer L1. According to the one embodiment of the present disclosure, the second layer L2 may be provided on the protection layer of the first layer L1. As describe above, the protection layer of the first layer L1 may contain the copolymer of the aromatic vinyl monomer, the unsaturated carboxylic acid monomer, and the unsaturated dicarboxylic anhydride monomer. The copolymer configuring the protection layer may have a relatively lower melting point than an inorganic compound. Thus, if the second layer L2 is directly formed on the protection layer, a forming method may be limited. Specifically, the second layer L2 is hard to be formed through a process requiring high temperature in the same manner as deposition. This is because the protection layer with a relatively low melting point may be deformed during a depositing process. In addition, if temperature of the depositing process is lowered, the second layer L2 may not be formed by a desired thickness. If a thickness of the second layer L2 is greater or smaller than an expected thickness, optical characteristics of the second layer L2 may change. Specifically, a wavelength range of light which passes through the second layer L2 may change. If the second layer L2 reflects light with a wavelength narrower than expected, a wavelength band of light which is incident on the color conversion layer CF may change. Such a phenomenon decreases efficiency of the color conversion layer CF.

According to the one embodiment of the present disclosure, an upper portion of the first layer L1 or the protection layer is coated with the second layer L2, and thus, process temperature is relatively low. Hence, according to the present disclosure, the second layer L2 may be directly formed on the first layer L1 without damaging the first layer L1. If the second layer L2 is directly formed on the first layer L1, there are many advantages compared with a case where the second layer L2 is formed at a separate manufacturing process and thereafter is attached onto the first layer L1. First, it is not necessary to prepare another process line for forming only the second layer L2. Accordingly, it is possible to significantly reduce a size of the entire product processing facilities, processing time, and processing cost. In addition, an adhesive material for joining the second layer L2 to the first layer L1 is not required. If the adhesive material is interposed between the second layer L2 and the first layer L1, optical characteristics of the display device, particularly, permeability may decrease.

The second layer L2 makes light with the first wavelength band pass therethrough. The first wavelength band may change depending on a wavelength of light which is emitted from a light source and a function of the second layer L2. If a light source emits blue light with a wavelength of, for example, approximately 440 nm to approximately 480 nm, the first wavelength band may also be approximately 440 nm to approximately 480 nm. The second layer L2 does not make light with other wavelength bands pass therethrough, and thereby, light with a relatively narrow wavelength band may be incident on the color conversion layer CF. Thus, efficiency of the color conversion layer CF may increase.

According to the one embodiment of the present disclosure, the second layer L2 may reflect light with a wavelength of approximately 500 nm to approximately 680 nm. For this, the second layer L2 may be configured with plural layers. A structure of the second layer L2 will be described later.

Referring to FIG. 2, the color conversion layer CF is provided on the second layer L2. However, the color conversion layer CF may be provided on the first layer L1 if necessary. In this case, the optical filter OFU may have a structure in which the color conversion layer CF, the first layer L1, and the second layer L2 are sequentially stacked. The color conversion layer CF may convert light which is emitted from the light source LU. "Conversion of light" which is performed by the color conversion layer CF means that a wavelength of light which is incident on the color conversion layer CF is changed. Specifically, the color conversion layer CF may absorb first light with the first wavelength band and may emit at least one beam of light with a wavelength different from the first wavelength band. For example, if light with an ultraviolet wavelength band is incident on the color conversion layer CF, a plurality of the color conversion layers CF may respectively emit light with a wavelength band of a blue light, a green light, and a red light in a visible wavelength band. For this, the color conversion layer CF may include the quantum dot and/or a fluorescent substance. The number of the quantum dots and/or the fluorescent substances is not limited in particular, and the skilled in the art may determine the number of the quantum dots and/or the fluorescent substances.

The fluorescent substance included in the color conversion layer CF may be a red fluorescent substance, a blue fluorescent substance, a green fluorescent substance, a yellow fluorescent substance, a white fluorescent substance, or the like. The red fluorescent substance may contain at least one of $Y_2O_2S$, $La_2O_2S$, $Ca_2Si_5N_8$, $Sr_2Si_5N_8$, $Ba_2Si_5N_8$, CASN ($CaAlSiN_3$), $La_2W_3O_{12}$, $Eu_2W_3O_{12}$, $Ca_3MgSi_2O_8$, $Sr_3MgSi_2O_8$, $Ba_3MgSi_2Os$, $LiEuW_2O_8$, and $LiSmW_2O_8$. The green fluorescent substance may contain at least of $Ca_2SiO_4$, $Sr_2SiO_4$, $Ba_2SiO_4$, BAM, α-SiAlON, $Ca_3Sc_2Si_3O_{12}$, $Tb_3Al_5O_{12}$, and $LiTbW_2O_8$. The blue fluorescent substance may contain at least one of $BaMgAl_{10}O_{17}$, $Mg_5(PO_4)_3Cl$, $Ca_5(PO_4)_3Cl$, $Sr_5(PO_4)_3Cl$, $Ba_5(PO_4)_3Cl$, $EuSi_9Al_{19}ON_{31}$, and $La_{1-x}Ce_xAl(Si_{6-z}Al_z)(N_{10-z}O_z)$. The yellow fluorescent substance may contain at least one of $SrGa_2S_4:Eu^{2+}$, $Sr_2Ga_2S_5:Eu^{2+}$, and $YAG:Ce^{3+}$.

The quantum dot may include any one of a Si-based quantum dot, a II-VI group compound semiconductor quantum dot, a III-V group compound semiconductor quantum dot, a IV-VI group compound semiconductor quantum dot, and a mixture thereof. The II-VI group compound semiconductor quantum dot may contain at least one selected from a group configured with CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HggZnTe, CdZnSeS, CdZnSeTe, CdZnSTe, CdHgSeS, CdHgSeTe, CdHgSTe, HgZnSeS, HgZnSeTe, and HgZnSTe. The III-V group compound semiconductor quantum dot may contain at least one selected from a group configured with GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs. The IV-VI group compound semiconductor quantum dot may contain SbTe. As described above, the smaller the size of the particle of the quantum dot is, light with the shorter wavelength is emitted. For example, red light may be emitted from the quantum dot with a size of 55 to 65 Å, green light may be emitted from the quantum dot with a size of 40 to 50 Å, and blue light may be emitted from the quantum dot with a size of 20 to 35 Å.

The color conversion layer CF may include quantum dots and/or fluorescent substances different from each other depending on the pixels. For example, according to the one embodiment of the present disclosure, the light source LU emits blue light with a wavelength of approximately 440 nm to approximately 480 nm. In this case, a first color conversion layer CF1 included in the pixel PXL1 may include the quantum dot with a size of 55 to 65 Å which emits red light, and a second color conversion layer CF2 included in the pixel PXL2 may include the quantum dot with a size of 40 to 50 Å which emits green light. In addition, a third color conversion layer CF3 of the third pixel PXL3 may include a white fluorescent substance. As such, the first, second, and third color conversion layers CF1, CF2, and CF3 emit lights with wavelengths different from each other, and thus, the display device may display various colors.

A black matrix BM may be provided between the first color conversion layers CF1, CF2, and CF3. The black matrix BM prevents lights which pass through different quantum dots or different fluorescent substances from being mixed each other to be acknowledged to a user. The black matrix BM may contain Cr, carbon black, and the like, but is not limited to this. The skilled in the art may use the black matrix BM configured with an organic material if necessary.

An overcoat layer OC may be provided on the color conversion layer CF. The overcoat layer OC planarizes a surface of the display device 10. A material which can be used for the overcoat layer OC is not limited in particular. The skilled in the art may use an organic material and/or an inorganic material so as to form the overcoat layer OC. The overcoat layer OC may have adhesion characteristics at an interface. A thickness of the overcoat layer OC is not limited, but the overcoat layer OC may have a thickness which does not expose the color conversion layer CF.

A cover window CW may be provided on the overcoat layer OC. The cover window CW has light permeability and has relatively high hardness. Thus, the cover window CW protects the display device from external impact. A polymer compound such as polymethyl methacrylate (PMMA) and polycarbonate, or glass may be used for the cover window CW.

The light source LU emits light toward a refraction layer RRL such that display device may output an image. The light source LU may emit light with at least one color of red, blue, green, yellow, and white. In addition, the light source LU may also emit not only light in a visible area but also light in an ultraviolet area. The light source LU may be singular or plural. At this time, each light source LU may emit lights having the same color or lights having colors different from each other. A light emitting diode (LED), an organic electroluminescent thin film, an inorganic electroluminescent thin film, and the like may be used for the light source LU. In addition, the light source LU may include a two-element or three-element compound semiconductor of 2B, 3B, 4A, 4B, 5B, and 6B groups, such as silicon carbide (SiC), gallium arsenide (GaAs), gallium phosphide (GaP), gallium-arsenide-phosphorous (GaAs1-xPx), gallium-aluminum-arsenide (Ga1-xAlxAs), indium phosphide (InP), and indium-gallium-phosphorus (In1-xGaxP). The light source LU may include an organic luminescent material.

Figure 3A:
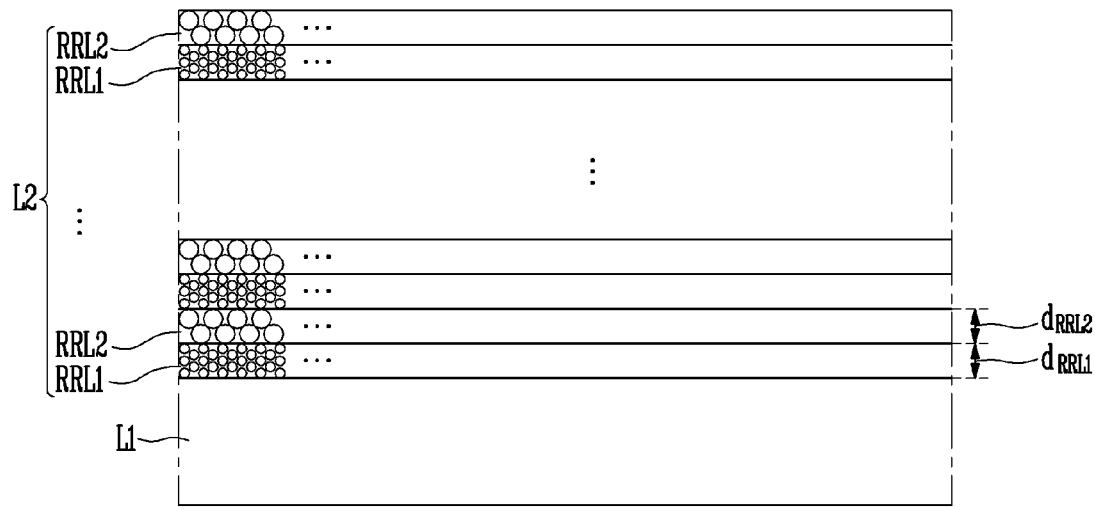
FIGS. 3A and 3B are cross-sectional views of a first layer and a second layer which are enlarged, according to the one embodiment of the present disclosure.
Figure 3B:
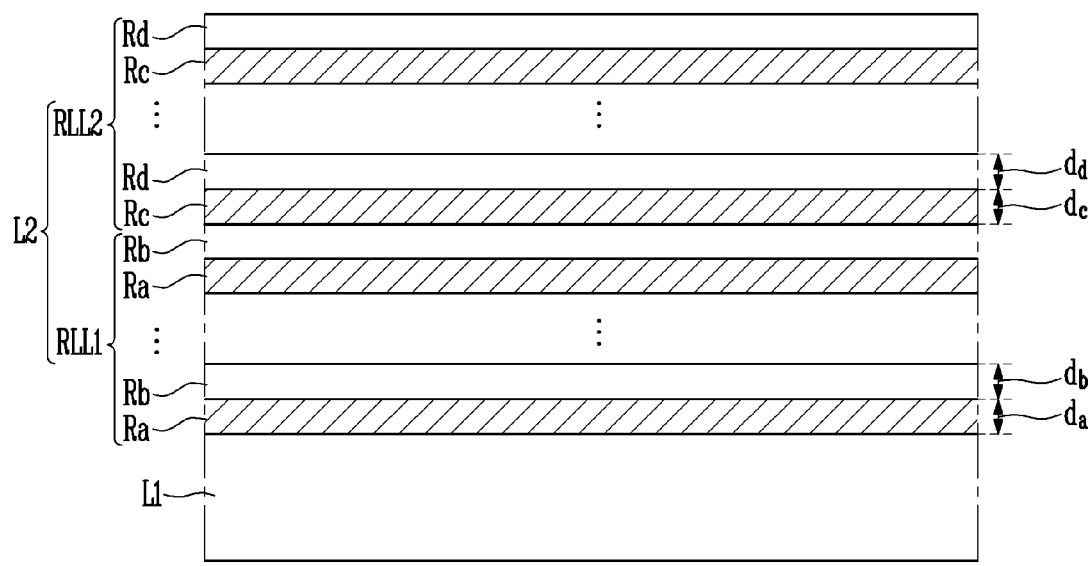

FIGS. 3A and 3B are cross-sectional views of the first layer and the second layer which are enlarged, according to the one embodiment of the present disclosure.

Referring to FIG. 3, the second layer L2 includes at least one first refraction layer RRL1 with a first refractive index and at least one second refraction layer RRL2 with a second refractive index. According to the one embodiment of the present disclosure, the number of the first refraction layers RRL1 and the number of the second refraction layers RRL2 may be respectively five to ten. If the number of the first refraction layers RRL1 and the number of the second refraction layers RRL2 are respectively less than five, the wavelength band of light which can be reflected from the second layer L2 may be narrowed. In addition, the reflectivity of the second layer L2 may decrease. If the number of the first refraction layers RRL1 and the number of the second refraction layers RRL2 are respectively larger than ten, process cost may be significantly increased due to an increase in the number of the first refraction layers RRL1 and the second refraction layers RRL2. If the first refraction layer RRL1 and the second refraction layer RRL2 are paired, the number of the first refraction layers RRL1 is equal to the number of the second refraction layers RRL2. In addition, in above case, the first refraction layers RRL1 and the second refraction layers RRL2 may be alternately stacked. As the first refraction layers RRL1 and the second refraction layers RRL2 may be alternately stacked, the second layer L2 may reflect light with a wavelength of a specific band and may transmit the light with the first wavelength band.

The first refraction layer RRL1 and the second refraction layer RRL2 have reflective indexes different from each other. That is, the first refraction layer and the second refraction layer are different from each other. According to the one embodiment of the present disclosure, the reflective index of the first refraction layer is larger than that of the second refraction layer. The reflective index of the first refraction layer and the reflective index of the second refraction layer may differ by approximately 0.4 to approximately 0.7. Since there is a large difference in reflective indexes between the first refraction layer and the second refraction layer, the second layer L2 according to the present disclosure may reflect light with a relatively wide wavelength band. If there is a small difference in reflective indexes between the first refraction layer and the second refraction layer, the wavelength band of the light which can be reflected from the second layer L2 may be narrowed and thereby, light with an undesired wavelength may be incident on the color conversion layer CF. As described above, if the light with an undesired wavelength is incident on the color conversion layer CF, efficiency of the color conversion layer CF may decrease. In order to realize such a difference between the reflective indexes, the first refraction layer RRL1 and the second refraction layer RRL2 may have thicknesses different from each other, and may be formed of materials different from each other.

According to the one embodiment of the present disclosure, the first refraction layer RRL1 includes metal oxide. Thus, the first refraction layer RRL1 may include metal oxide of metals such as Ag, Mg, Zn, Al, Mo, Pt, and Au. Such metal oxide may be included in the first refraction layer RRL1 in a state of particles. The first refraction layer RRL1 may further include a binder for binding the metal oxide in a state of particles.

According to the one embodiment of the present disclosure, the second refraction layer RRL2 may include non-metal inorganic oxide. For example, the second refraction layer RRL2 may include silica. The second refraction layer RRL2 may also further include a binder for binding the silica. The binders which are included in the first refraction layer RRL1 and the second refraction layer RRL2 may have excellent light transmittance.

Sizes of particles included in the first refraction layer RRL1 and the second refraction layer RRL2 may differ from each other. If the first refraction layer RRL1 is larger than the second refraction layer RRL2, the size of the particle in the first refraction layer RRL1 may be smaller than the size of the particle in the second refraction layer RRL2. In addition, thicknesses of the first refraction layer RRL1 and the second refraction layer RRL2 may change depending on wavelength bands of light which passes through or is reflected from the second layer L2. If the first wavelength band of light which passes through the second layer L2 is approximately 440 nm to approximately 480 nm, the thickness of the first refraction layer RRL1 may be approximately 70 nm to approximately 90 nm, and the thickness of the second refraction layer RRL2 may be approximately 90 nm to approximately 110 nm. As the first refraction layer RRL1 and the second refraction layer RRL2 have the thicknesses described above, the first reflection layer and the second refraction layer may reflect light with a wavelength of approximately 500 nm to approximately 680 nm.

Referring to FIG. 3B, the second layer L2 includes a first reflection layer RLL1 which reflects light with a third wavelength band and a second reflection layer RLL2 which reflects light with a fourth wavelength band. At this time, the third wavelength band described with reference to FIG. 3B may be similar to the fourth wavelength band described with reference to FIG. 3A. Each of the first reflection layer RLL1 and the second reflection layer RLL2 may include at least one first reflection sub-layers Ra and Rc and at least one the second reflection sub-layers Rb and Rd.

The first reflection sub-layer Ra included in the first reflection layer RLL1 may include the same material as or a different material from the first reflection sub-layer Rc included in the second reflection layer RLL2. The second reflection sub-layer Rb included in the first reflection layer RLL1 may include the same material as or a different material from the second reflection sub-layer Rd included in the second reflection layer RLL2. The first reflection sub-layer Ra included in the first reflection layer RLL1 may have the same refractive index as the first reflection sub-layer Rc included in the second reflection layer RLL2. In addition, the second reflection sub-layer Rb included in the first reflection layer RLL1 may have the same refractive index as the second reflection sub-layer Rd included in the second reflection layer RLL2. The refractive indexes of the first reflection sub-layers Ra and Rc may be approximately 1.6 to approximately 1.7. In addition, the refractive indexes of the second reflection sub-layers Rb and Rd may be approximately 1.4 to approximately 1.5. Thus, differences between the refractive indexes of the first reflection sub-layers Ra and Rc and the refractive indexes of the second reflection sub-layers Rb and Rd are relatively small. This is because the first reflection sub-layers Ra and Rc and the second reflection sub-layers Rb and Rd may be formed of an organic compound. The first reflection sub-layers Ra and Rc and the second reflection sub-layers Rb and Rd which are formed of the organic compound have good processability but a refractive index difference between reflection layers is relatively small. As described above, the larger the refractive index difference is, light with the wider wavelength band may be reflected. Thus, the example illustrated in FIG. 3B has a relatively narrow wavelength band of light which can be reflected from the reflection layer, compared with the example illustrated in FIG. 3A. According to FIG. 3B, the first reflection layer RLL1 and the second reflection layer RLL2 may reflect light with wavelength bands different from each other. For example, the third wavelength band which is a wavelength band of light that is reflected from the first reflection layer RLL1 may be approximately 590 nm to approximately 680 nm, and the fourth wavelength band which is a wavelength band of light that is reflected from the second reflection layer RLL2 may be approximately 500 nm to approximately 590 nm. In this case, light with the wavelength of approximately 440 nm to approximately 480 nm which is emitted from a light source may pass through the second layer L2, and light with an undesired wavelength band is reflected from the second layer L2. Since the light with the undesired wavelength band does not pass through the second layer L2 to be incident on the color conversion layer, efficiency of the color conversion layer CF may increase. In order to realize such reflection, thicknesses of the first reflection layer RLL1 and the second reflection layer RLL2 may differ from each other.

In order to differently form the thicknesses of the first reflection layer RLL1 and the second reflection layer RLL2, thicknesses $d_a$ and $d_b$ of the first reflection sub-layer Ra and the second reflection sub-layer Rb which are included in the first reflection layer RLL1 may differ from thicknesses $d_c$ and $d_c$ of the first reflection sub-layer Rc and the second reflection sub-layer Rd which are included in the second reflection layer RLL2. The thickness $d_a$ of the first reflection sub-layer Ra included in the first reflection layer RLL1 may differ from the thickness $d_c$ of the first reflection sub-layer Rc included in the second reflection layer RLL2. In addition, the thickness $d_b$ of the second reflection sub-layer Rb included in the first reflection layer RLL1 may differ from the thickness $d_d$ of the second reflection sub-layer Rd included in the second reflection layer RLL2. Accordingly, the thickness of the first reflection layer RLL1 may be larger than the thickness of the second reflection layer RLL2.

As described above, thicknesses of the first reflection layer RLL1 and the second reflection layer RLL2, and the lower reflection layers Ra, Rb, Rc, and Rd thereof may change depending on the wavelength bands of the light which is reflected from the first reflection layer RLL1 and the second reflection layer RLL2. If the thickness of the first reflection layer RLL1 is larger than the thickness of the second reflection layer RLL2, the first reflection layer RLL1 may reflect light with a higher wavelength band than the second reflection layer RLL2. In addition, the thicknesses of the respective lower reflection layers Ra, Rb, Rc, and Rd may change depending on the wavelength bands of the reflected light. If the thicknesses $d_a$ and $d_b$ of the first reflection sub-layer Ra and the second reflection sub-layer Rb which are included in the first reflection layer RLL1 are larger than the thicknesses $d_c$ and $d_d$ of the first reflection sub-layer Rc and the second reflection sub-layer Rd which are included in the second reflection layer RLL2, the first reflection layer RLL1 may reflect light with a higher wavelength band than the second reflection layer RLL2. For example, if the third wavelength band which is a wavelength band of light that is reflected from the first reflection layer RLL1 is approximately 590 nm to approximately 680 nm and the fourth wavelength band which is a wavelength band of light that is reflected from the second reflection layer RLL2 is approximately 500 nm to approximately 590 nm, the thickness of the first reflection layer RLL1 is larger than the thickness of the second reflection layer RLL2.

The first reflection layer RLL1 and the second reflection layer RLL2 may be formed by stretching stack materials in which the first reflection sub-layers Ra and Rc and the second reflection sub-layers Rb and Rd are alternately stacked. If the first reflection sub-layers Ra and Rc are formed of the same material and the second reflection sub-layers Rb and Rd are also formed of the same material, the first reflection layer RLL1 and the second reflection layer RLL2 may be formed only by stretching the same stack materials. Thus, in this case, the first reflection layer RLL1 and the second reflection layer RLL2 may be formed by using the same process and thus, process cost and process time may be significantly reduced. The thicknesses of the first reflection layer RLL1 and the second reflection layer RLL2 may be adjusted through the stretching process. According to the one embodiment of the present disclosure, if the thickness of the first reflection layer RLL1 is larger than the thickness of the second reflection layer RLL2, the second reflection layer RLL2 is stretched more than the first reflection layer RLL1.

Figure 4A:
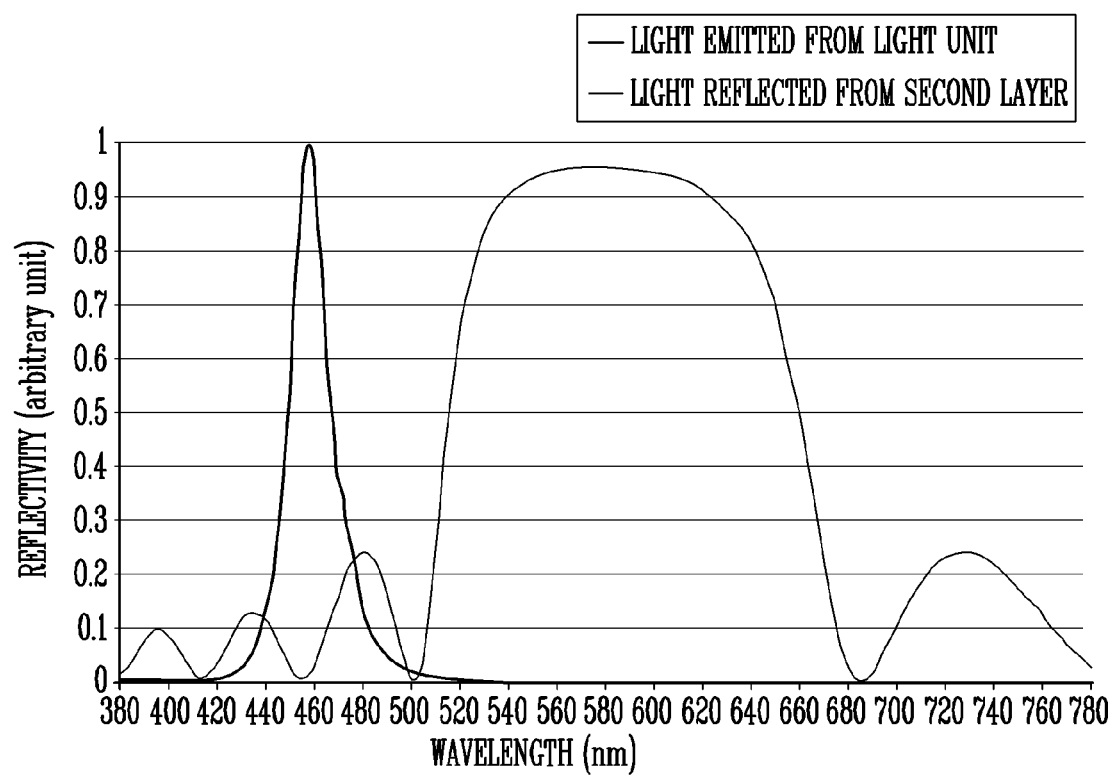
FIGS. 4A and 4B are graphs illustrating reflectivity corresponding to a wavelength of an optical filter according to the one embodiment of the present disclosure.
Figure 4B:
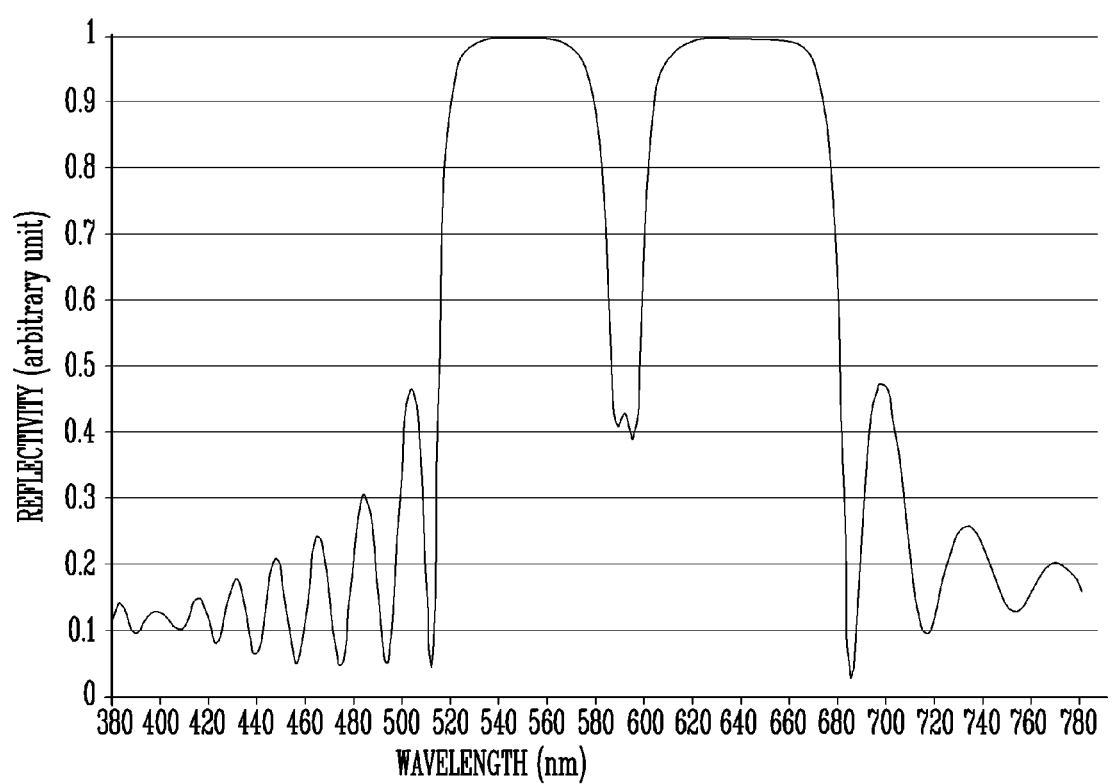

FIGS. 4A and 4B are graphs illustrating reflectivity corresponding to the wavelength of the optical filter according to the one embodiment of the present disclosure. In addition, FIG. 5 is a graph illustrating reflectivity corresponding to the thickness of the second layer according to the one embodiment of the present disclosure.

FIG. 4A illustrates the reflectivity corresponding to the wavelength of the optical filter illustrated in FIG. 3A. Referring to FIG. 3A, the light source emits light with a relatively narrow wavelength of approximately 440 nm to approximately 480 nm. In order to emit the light with the relatively narrow wavelength as such, the light source may include quantum dots. According to the example illustrated in FIG. 4A, the light source may include the quantum dots for emitting blue light. As the light source emits light with the relatively narrow wavelength, efficiency of the color conversion layer may increase.

Referring to FIG. 4A, the second layer may reflect light with a wavelength of approximately 500 nm to approximately 680 nm. Accordingly, green light and red light do not pass through the second layer to be incident on the color conversion layer. As only the blue light is incident on the color conversion layer, efficiency of the color conversion layer may increase.

FIG. 4B illustrates reflectivity corresponding to the wavelength of the optical filter illustrated in FIG. 3B. Referring to FIG. 4B, a curved line of the reflectivity has two large peaks. The two peaks respectively indicate reflections from the first reflection layer and the second reflection layer of the second layer. That is, the reflected light from the first reflection layer has the third wavelength band of approximately 590 nm to approximately 680 nm, and the reflected light from the second reflection layer has the fourth wavelength band of approximately 500 nm to approximately 590 nm. As the reflected light from the first reflection layer has the third wavelength band, red light may be reflected. In addition, as the reflected light from the second reflection layer has the fourth wavelength band, green light may be reflected. Thus, green light and red light do not pass through the second layer to be incident on the color conversion layer. As only the blue light is incident on the color conversion layer, efficiency of the color conversion layer may increase.

FIG. 5 illustrates the reflectivity corresponding to the thickness of the second layer. Referring to FIG. 5, as the thickness of the second layer increase, the reflectivity of the second layer increases. Referring to FIG. 5, the second layer with a thickness of more than 3.7 μm has reflectivity of more than 90%. Thus, by using the optical filter including the second layer with the thickness of the aforementioned range, it is possible to prevent light with an undesired wavelength from being incident on the color conversion layer. The larger the thickness of the second layer is, the more the reflectivity increases, but if the thickness of the second layer exceeds 7.4 μm, manufacturing cost may significantly increase and a thickness of the entire display device may increase.

Above description is made with reference to the preferred embodiment of the present disclosure, but the skilled in the art or those having ordinary knowledge in the art will be able to understand that the present disclosure may be variously modified and changed in a range without departing from the spirit and a technical area of the present disclosure that are described in the scope of claims which will be described below.

Thus, the technical range of the present disclosure is not limited to the description of the specification of the application, and should be determined by the scope of claims.

What is claimed is:

1. An optical filter which makes light pass therethrough comprising:
    a polarizer configured to polarize the light;
    a second layer disposed directly on a first surface of the polarizer and passing through only light with a first wavelength band; and
    a color conversion layer disposed on the second layer, receiving the light with the first wavelength band, and converting the light with the first wavelength band into light with a second wavelength band,
    wherein the second layer includes at least one first refraction layer with a first refractive index and at least one second refraction layer with a second refractive index,
    wherein the at least one first refraction layer includes first particles of metal oxide and the at least one second refraction layer includes second particles of non-metal inorganic oxide, and
    wherein a size of each of the first particles is smaller than a size of each of the second particles.

2. The optical filter according to claim 1, wherein the first wavelength band is 440 nm to 480 nm.

3. The optical filter according to claim 1, wherein the second layer reflects light with a wavelength of 500 nm to 680 nm.

4. The optical filter according to claim 1, wherein each of the number of the first refraction layers and the number of the second refraction layers is from five layers to ten layers.

5. The optical filter according to claim 1, wherein the second layer includes the first refraction layer and the second refraction layer which are alternately stacked.

6. The optical filter according to claim 1, wherein the first refractive index is larger than the second refractive index.

7. The optical filter according to claim 6, wherein a thickness of the first refraction layer is smaller than a thickness of the second refraction layer.

8. The optical filter according to claim 1, wherein the color conversion layer includes a quantum dot.

9. A display device comprising:
    a light source configured to emit light;
    a display panel disposed on the light source; and
    an optical filter disposed on the display panel,
    wherein the optical filter which makes the light pass therethrough includes,
        a polarizer configured to polarize the light;
        a second layer disposed directly on a first surface of the polarizer and passing through only light with a first wavelength band; and
        a color conversion layer disposed on the second layer, receiving the light with the first wavelength band, and converting the light with the first wavelength band into light with a second wavelength band,
    wherein the second layer includes at least one first refraction layer with a first refractive index and at least one second refraction layer with a second refractive index,
    wherein the at least one first refraction layer includes first particles of metal oxide and the at least one second refraction layer includes second particles of non-metal inorganic oxide, and
    wherein a size of each of the first particles is smaller than a size of each of the second particles.

10. The display device according to claim 9, wherein the light source emits light with a wavelength of 440 nm to 480 nm.

11. The display device according to claim 9,
    wherein the second layer includes the first refraction layer and the second refraction layer which are alternately stacked, and
    wherein the first refractive index is larger than the second refractive index.

* * * * *